United States Patent [19]
Walker et al.

[11] Patent Number: 6,107,932
[45] Date of Patent: Aug. 22, 2000

[54] SYSTEM AND METHOD FOR CONTROLLING ACCESS TO A VENUE USING ALTERABLE TICKETS

[75] Inventors: Jay S. Walker, Ridgefield; Daniel E. Tedesco, Monroe; James A. Jorasch, Stamford, all of Conn.

[73] Assignee: Walker Digital, LLC, Stamford, Conn.

[21] Appl. No.: 08/916,656

[22] Filed: Aug. 22, 1997

[51] Int. Cl.[7] .............................................. G06F 153/02
[52] U.S. Cl. .......................... 340/825.31; 705/6; 705/37; 705/5; 340/825.34; 340/825.31; 340/825.3
[58] Field of Search ................................ 705/5, 6, 4, 37; 379/26, 32, 279, 280, 381, 384; 345/329, 355; 273/139; 340/825.34, 825.3, 825.31

[56] References Cited

U.S. PATENT DOCUMENTS

| | | | |
|---|---|---|---|
| 3,757,685 | 9/1973 | Woodie et al. | 101/66 |
| 3,829,133 | 8/1974 | Smagala-Romanoff | 283/70 |
| 3,937,894 | 2/1976 | Gryzbowski et al. | 379/26 |
| 4,522,429 | 6/1985 | Gardner et al. | 283/91 |
| 4,721,954 | 1/1988 | Mauch | 340/825.31 |
| 4,867,481 | 9/1989 | Gundjian | 283/91 |
| 4,972,182 | 11/1990 | Novik et al. | 340/825.32 |
| 5,018,286 | 5/1991 | Zahner | 40/665 |
| 5,053,612 | 10/1991 | Pielemeier et al. | 235/462.42 |
| 5,171,040 | 12/1992 | Orndorff | 283/93 |
| 5,204,663 | 4/1993 | Lee | 340/825.34 |
| 5,290,068 | 3/1994 | Gundjian | 283/67 |
| 5,291,243 | 3/1994 | Heckman et al. | 399/3 |
| 5,317,135 | 5/1994 | Finocchio | 463/17 |
| 5,338,066 | 8/1994 | Gundjian | 283/67 |
| 5,338,067 | 8/1994 | Gundjian | 283/67 |
| 5,354,723 | 10/1994 | Gundjian | 503/201 |
| 5,421,869 | 6/1995 | Gundjian et al. | 106/31.19 |
| 5,424,266 | 6/1995 | Gundjian | 503/201 |
| 5,451,052 | 9/1995 | Belm et al. | 273/139 |
| 5,476,830 | 12/1995 | Gundjian | 503/206 |
| 5,491,752 | 2/1996 | Kaufman et al. | 380/30 |

(List continued on next page.)

OTHER PUBLICATIONS

Kempner, M; "Look for Olympic Tickets to Begin Arriving this Month," The Atlanta Journal and Constitution, Local Olympics, p. 01B, May 8, 1996 (2 pages).

"Paper That Can Keep a Secret," Financial Times, Section I, Technology, p. 20, Feb. 27, 1990 (1 page).

Associated Press; "Firm Hoping For Big Future in Sales of Copy–Proof Paper," Chicago Tribune, Business, p. 17, Jun. 23, 1986 (1 page).

Jones, C. "James River's Security Papers Aimed at Taking a Bite Out of Crime," The Richmond Times Dispatch, City Edition, Metro Business, p. D–12, Nov. 27, 1995 (2 pages).

Hutchinson, R., "High–Tech Theft, High–Tech Solution," Wichita Business Journal, vol. 12 No. 12, p. 1, Mar. 14, 1997 (3 pages).

Tucker, T., "Security & Controls: Georgia Pacific Check Paper Equipped with Scratch Test," The American Banker, Technology/Operations, p. 14, Jan. 25, 1995 (2 pages).

Gilmore, C., "Technology is Fueling the Rise of Check Fraud," Kansas City Business Journal, vol. 12, No. 31, Sec. 1, p. 3, Apr. 22, 1994 (2 pages).

(List continued on next page.)

Primary Examiner—James P. Trammell
Assistant Examiner—Cuong H. Nguyen
Attorney, Agent, or Firm—Dean Alderucci; Steven M. Santisi

[57] ABSTRACT

An alterable ticket and a system and method for controlling access to and within a venue using the alterable ticket. As described in one aspect of the disclosure, a ticket holder purchases such a ticket that conveys a right to access the venue. The ticket is altered in order to modify that right. Because the ticket is altered, it cannot be used by the ticket holder to gain access to the venue. A computer system tracks that the ticket has been altered and enables a refund to be provided to the ticket holder. In this way, a second ticket, conveying the same right as the altered ticket, may be sold to a second ticket holder. According to another aspect of the disclosure, a ticket holder purchases a ticket that conveys a right to occupy a first seat in a venue. The ticket is physically altered in order to upgrade the first seat to a second seat.

41 Claims, 18 Drawing Sheets

U.S. PATENT DOCUMENTS

| | | | |
|---|---|---|---|
| 5,499,816 | 3/1996 | Levy | 273/139 |
| 5,516,362 | 5/1996 | Gundjian et al. | 106/31.32 |
| 5,532,200 | 7/1996 | Gundjian | 503/201 |
| 5,595,590 | 1/1997 | Belding et al. | 106/31.17 |
| 5,606,609 | 2/1997 | Houser et al. | 380/4 |
| 5,620,182 | 4/1997 | Rossides | 705/14 |
| 5,636,874 | 6/1997 | Singer | 283/94 |
| 5,644,721 | 7/1997 | Chung et al. | 705/6 |
| 5,797,126 | 8/1998 | Helbling et al. | 705/5 |

OTHER PUBLICATIONS

Armstrong, M.W., "Its Printer's Inks Make Products One of a Kind," Philadelphia Business Journal, vol. 11, No. 36, Sec. 1, P.3, Nov. 9, 1992 (3 pages).

"Inexpensive Safeguards Available," St. Louis Post–Dispatch, Business Plus, p. 13, Apr. 6, 1992 (2 pages).

Schmitt, M.; "Cavs Game Brightens Teen's Day; Season Ticket Holder Working With Hospital," The Plain Dealer, Sports, p. 4D; Jan. 11, 1997 (2 pages).

"TravelWeb Air Reservation Retrieval," http://www.travelweb.com/travelweb/global/comingsoon.html, Mar. 11, 1997 (1 page).

"Late Show With David Letterman Ticket Exchange," http://www.gettysburg.edu/~S366753/lateshow/tix.html (2pages).

"Air Travel," http://www.washington.edu/admin/travel/air.travel.html#unused.tickets (2 pages).

"Booking With Timmi," http://www.yomi.fi/timmi/tinglish.html (8 pages).

"Reservations, Cancellations and Refunds," http://www.sunshine.net/www/100/sn0156/cancell.htm (1 page).

"Round–Up and Happy Canyon Ticket Information," http://www.ucinet.com/~roundup/ruticks.htm (2 pages).

220

| LOCATION IDENTIFIER 220A | TICKET STATUS 220B | CODE 220C | TICKET PRICE 220D |
|---|---|---|---|
| A123 | VALID | X4A9 | $75.00 |
| B234 | INVALID | X978 | $50.00 |
| C456 | INVALID | X42B | $50.00 |
| D192 | VALID | LX92 | $45.00 |

230

| LOCATION IDENTIFIER 230A | REFUND FACTOR 230B | REFUND AMOUNT 230C | REFUND INFORMATION 230D |
|---|---|---|---|
| B234 | 50% | $25.00 | JOE SMITH, CREDIT CARD NUMBER: 1111-2222-3333-4444, EXP. 12/97 |
| C456 | 50% | $25.00 | SUE JOHNSON, CREDIT CARD NUMBER: 9999-8888-7777-6666, EXP. 3/98 |

| LOCATION IDENTIFIER 240A | RESALE AMOUNT 240B |
|---|---|
| B234 | $50.00 |
| C456 | $50.00 |

| LOCATION IDENTIFIER 920A | UPGRADE STATUS 920B | TICKET CLASS 920C | CELL LOCATOR 920D |
|---|---|---|---|
| BX39 | UPGRADED | MEZZANINE | D5 |
| AG27 | NOT UPGRADED | BOX | B2 |

| UPGRADE 930A | COST 930B |
|---|---|
| UPPER DECK TO MEZZANINE | $10.00 |
| UPPER DECK TO BOX | $35.00 |
| MEZZANINE TO BOX | $20.00 |

| LOCATION IDENTIFIER 940A | TICKET CLASS 940B |
|---|---|
| AB16 | BOX |
| B627 | MEZZANINE |
| CD12 | UPPER DECK |
| CF01 | UPPER DECK |

FIG. 12

SYSTEM AND METHOD FOR CONTROLLING ACCESS TO A VENUE USING ALTERABLE TICKETS

BACKGROUND OF THE INVENTION

1. Field of the Invention

The present invention relates to a system and method for controlling access to a venue using alterable tickets.

2. Description of the Prior Art

A venue, as used herein, is a space having controlled access for holding an event. An event, as used herein, is something that takes place in or at the venue. For example, a stadium is a venue typically used to hold a sporting event.

To control access to a venue for an event, an entity associated with the venue usually sells a predetermined number of tickets. The entity selling the tickets may be associated with an organization using the venue, such as a team playing a sporting event there. Alternatively, the entity selling the tickets may be a third party ticket provider, such as TicketMaster®. A ticket holder who desires to attend the event may purchase one of the tickets from the entity selling the tickets.

When a ticket to the event is purchased, it confers a specific right to the ticket holder. Normally, when purchased, the ticket confers to the ticket holder a right to occupy a certain physical space in the venue during the event. The physical space may be a particular seat within the venue. Alternatively, the physical space may be a general location within the venue, as in the case of a general admission ticket.

The ticket usually includes a section having printed indicia that describe the right afforded to the ticket holder. For example, the ticket may include a date on which the event is to take place, a time at which the event is to begin, and a brief description of the event (such as the name of two teams that are participating in the event). The ticket usually also includes a location identifier, for example, a seat number. The location identifier identifies the physical space in the venue that the ticket holder has the right to occupy during the event.

Sometimes, a series of related events are held at a venue. For example, in the case of sporting events, a particular team may play several games at the venue during a season. These games are typically known as "home games." Avid fans of the team may desire to purchase tickets to all of the home games. Thus, a set of tickets, typically known as "season tickets" (or "subscription tickets"), may be purchased by the fan from the entity selling tickets. The season tickets typically include one ticket for each of the home games.

Access to the venue for an event typically is controlled without the need for sophisticated technology at the point of admission to the venue, as follows. At a time shortly before the event is to begin, the ticket holder holding the ticket approaches a gate at the venue. There, the ticket holder hands the ticket to a ticket-taker who visually examines the ticket. Generally, this is done to determine whether the date, time, and description of the event on the ticket corresponds to the current date, time and event which presently is being held at the venue. If they do correspond, then the ticket holder is permitted access to the venue where he will occupy the physical space described by the location identifier on the ticket. If they do not correspond, the ticket holder is denied access to the venue.

Because most tickets are typically non-refundable and non-exchangeable, individuals are sometimes reluctant to purchase tickets to events. Further, it is quite common that an individual, having purchased a ticket to an event, for any number of reasons will not be able to attend that event. As a consequence of this risk, many individuals that otherwise might purchase tickets choose not to. Therefore, revenues to entities selling tickets often run well below potential demand.

In the past, ticket holders have been limited in the ways in which they could obtain a refund for a ticket—that is, a return of something of value to the ticket holder in exchange for the right conferred by the ticket. As stated above, tickets are often non-refundable and non-exchangeable. This permits the entity selling tickets to keep the payment for the ticket once it has been received. This convenience to the seller comes, however, at the expense of demand as described above.

The non-refundable and non-exchangeable nature of most tickets has given rise to ticket brokers and ticket scalpers, which provide a service for ticket holders to obtain a refund for a valid but unused ticket. Ticket brokers typically are situated at a location that is remote from the venue and from the ticket holder. To use a ticket broker, a ticket holder seeking a refund for a ticket usually travels to the ticket broker to physically surrender the ticket. In exchange for the ticket, the ticket broker pays the ticket holder an amount that is usually less than the face value of the ticket. Then, the ticket broker resells the same ticket to another party for face value or for an inflated price. It is noted that ticket brokers are illegal in many jurisdictions or have markups limited by law.

Ticket scalpers are well known, even though they too are illegal in many jurisdictions. Ticket scalpers usually operate in close proximity to the venue itself and only offer their services for a short time approximately at the start of an event. A ticket holder desiring to obtain a refund for a valid but unused ticket must usually, therefore, visit a location near the venue at a time immediately prior to the event to physically surrender the ticket to the ticket scalper. The ticket scalper typically pays the ticket holder a discount from the face value of the ticket and attempts to resell the same ticket for more than that value.

There are other known ways in which a ticket holder can obtain a refund for a ticket. For example, according to one program, the ticket holder physically surrenders the ticket to an entity associated with the venue. Upon receipt, the entity attempts to resell the ticket to the public at face value. If the ticket is resold, then the ticket holder who submitted the ticket receives a partial refund. The refund is equal to the face value of the ticket less a predetermined handling fee that is a percentage of the face value.

The above described services and programs suffer from a number of problems. More specifically, in order for a ticket holder to obtain a refund for a ticket, he must physically surrender the ticket to another party. To effect such a physical surrender, the ticket holder may be required to travel to a remote establishment or to the venue itself. A ticket holder who cannot attend an event due to time constraints may find this requirement to be unduly burdensome. The burden imposed on the ticket holder is exacerbated in the case of ticket scalpers because they typically operate near the venue itself at the approximate time of the event. Thus, for a ticket holder who cannot attend the event because of its place and time, it is highly unlikely that he will be able to physically surrender the ticket to the ticket scalper.

Further, some programs may permit a ticket holder to physically deliver a ticket for a refund by mail. While this may reduce the burden placed on the ticket holder, the mail often is not a viable option. This is because the mail typically takes several days to be delivered. For a ticket holder who realizes that he will not be able to attend an event hours prior to or on the day of the event, the mail is not a practical way in which to obtain a refund for the ticket.

Still further, the use of an overnight delivery service (such as Federal Express) may not prove to be an adequate vehicle for the physical surrender of a ticket. This is because the cost of the overnight delivery service may be prohibitively high. Also, if the ticket holder realizes that he cannot attend the event on the same day as the event, then there will not be enough time to use the overnight delivery service.

There is a further risk that a ticket will be lost or stolen during delivery via the mail or an overnight delivery service. In such a case, because the ticket can be considered a bearer instrument, the lost or stolen ticket might be used by a person other than the ticket holder who is seeking the refund. Thus, the ticket holder might not be able to obtain the refund he seeks.

Further, the use of some services which require the physical surrender of tickets may be illegal, as in the case of ticket brokers and ticket scalpers.

It is noted that requiring a ticket holder to physically surrender a ticket in order to obtain a refund generally provides an increased ability to control access to the venue. This is because once a ticket is physically surrendered by the ticket holder, he cannot improperly use the ticket to gain access to the venue.

Similar to the services and programs described above, airlines generally require that a traveler physically deliver an airline ticket to the airline (or a travel agent) before a refund will be provided. The airlines usually do, however, permit a traveler to change his flight reservations over the telephone, without physically surrendering the airline ticket at that time.

For example, a traveler can typically change his flight reservation by paying a predetermined fee. To do so, the traveler calls a travel agent (or an airline representative). The travel agent requests certain information from the traveler regarding the flight reservation he desires to change. Thus, the travel agent may request the flight number, date of the flight, the departure and destination cities, and the name of the traveler. Upon receipt of the information from the traveler, the travel agent enters the information into a sophisticated computer system in order to change the flight reservation. The airline ticket remains in the possession of the traveler.

While the traveler typically cannot obtain a refund for an airline ticket without physically surrendering the ticket itself, this mode for changing a flight reservation is convenient for the traveler because it may be done over the telephone. However, the added convenience to the traveler imposes a substantial risk on the airlines. More specifically, although the traveler's reservation has been changed, the underlying ticket remains intact and in the possession of the traveler. Thus, an unscrupulous traveler may attempt to use the underlying ticket for the flight that he has changed, or may attempt to sell the ticket to an unsuspecting traveler. For this reason, the airlines must typically use a sophisticated and expensive computer system, both at the check-in points and the departure gates, which verifies the validity of all tickets and reservations using a centralized database. This verification of airline tickets cannot be done simply by visual inspection of the ticket itself.

Ticket holders have also been limited in the ways in which they can improve their seat for an event by upgrading their ticket. For example, one upgrade program requires the ticket holder to physically surrender the ticket to a ticket window at the venue prior to the event in order to exchange it for a new ticket. Another program allows the ticket holder to purchase an "upgrade certificate" at the venue or by mail. Thus, with these programs, a ticket holder may improve his seat at the venue by upgrading his ticket. However, these upgrade programs suffer from the same disadvantage as the refund programs and services described above. That is, they either require the physical surrender of the ticket itself or submission via the mail, which, as described above, may be both unduly burdensome and not practical.

In view of the above, both ticket holders and entities selling tickets to events at venues are at a substantial disadvantage. With regard to the ticket holders, they typically bear a financial risk when they purchase a ticket to an event at a venue. This is because if a ticket holder is not able to attend the event, he risks losing the value of the ticket. As described above, the known programs and services which allow a refund to be obtained for tickets only by physical surrender of the ticket are of no avail because they are often unduly burdensome, impractical, prohibitively expensive, or illegal.

The entities selling tickets to events at venues suffer because ticket holders may choose not to purchase tickets for fear that they will not be able to attend an event. As a consequence, these entities are losing substantial revenues. Further, due to the overhead associated with keeping track of cancellations, refunds and exchanges, these entities have generally been excluded from the profitable ticket resale industry that is currently dominated by ticket scalpers and ticket brokers.

Accordingly, what is needed is a ticket system and method for controlling access to a venue which provides greater flexibility both to the ticket holder and the seller, encouraging holders to purchase more tickets and thereby creating more revenue for sellers.

SUMMARY OF THE INVENTION

One aspect of the present invention is directed to an article of manufacture. The article includes first indicia entitling a holder of the article to a right to enter a venue and second indicia for modifying the right. The second indicia are normally hidden under an alterable area so that when the alterable area is altered, the right to enter the venue is modified.

Another aspect of the present invention is directed toward a system for monitoring a status of a right to access a venue. The system has a ticket associated therewith which confers the right to access the venue and the ticket has a normally hidden code associated therewith. The system includes a memory having status data corresponding to the right to access the venue and data corresponding to the code. The system also includes a processor in communication with the memory. The processor is operative to receive the code and to alter the status data based on the received code and the data corresponding to the code so that the status is monitored.

Yet another aspect of the present invention is directed to a method for controlling access to a venue. The method includes the step of receiving a ticket. The ticket normally represents a right to access the venue and includes indicia which, when visible, indicates that the right to access the venue has been modified. The method also include the steps of examining the ticket to determine whether the ticket represents the right or the modified right and controlling access to the venue based on the right or the modified right.

Still another aspect of the present invention is directed to a method for enabling a holder, who is in communication with a server, to upgrade a ticket. The ticket has normally hidden upgrade indicia associated therewith. The method includes the steps of receiving a request to upgrade the ticket by the server from the holder and transmitting a signal from the server to the holder. The signal indicates a location of the normally hidden upgrade indicia. The method also may include the step of transmitting instructions to alter the location indicated by the signal to the holder from the server so that the ticket can be upgraded.

BRIEF DESCRIPTION OF THE DRAWINGS

Representative embodiments of the present invention will be described with reference to the following figures:

FIG. 4 depicts a diagrammatic view of a refund database 230.

FIG. 5 depicts a diagrammatic view of a resale database 240.

FIG. 10 depicts a diagrammatic view of a ticket database 920.

FIG. 11 depicts a diagrammatic view of a ticket upgrade database 930.

FIG. 12 depicts a diagrammatic view of an inventory database 940.

DETAILED DESCRIPTION OF THE PREFERRED EMBODIMENTS

Reference is now made to the accompanying Figures for the purpose of describing, in detail, the preferred embodiments of the present invention. The Figures and accompanying detailed description are provided as examples of the invention and are not intended to limit the scope of the claims appended hereto.

Figure 1A:
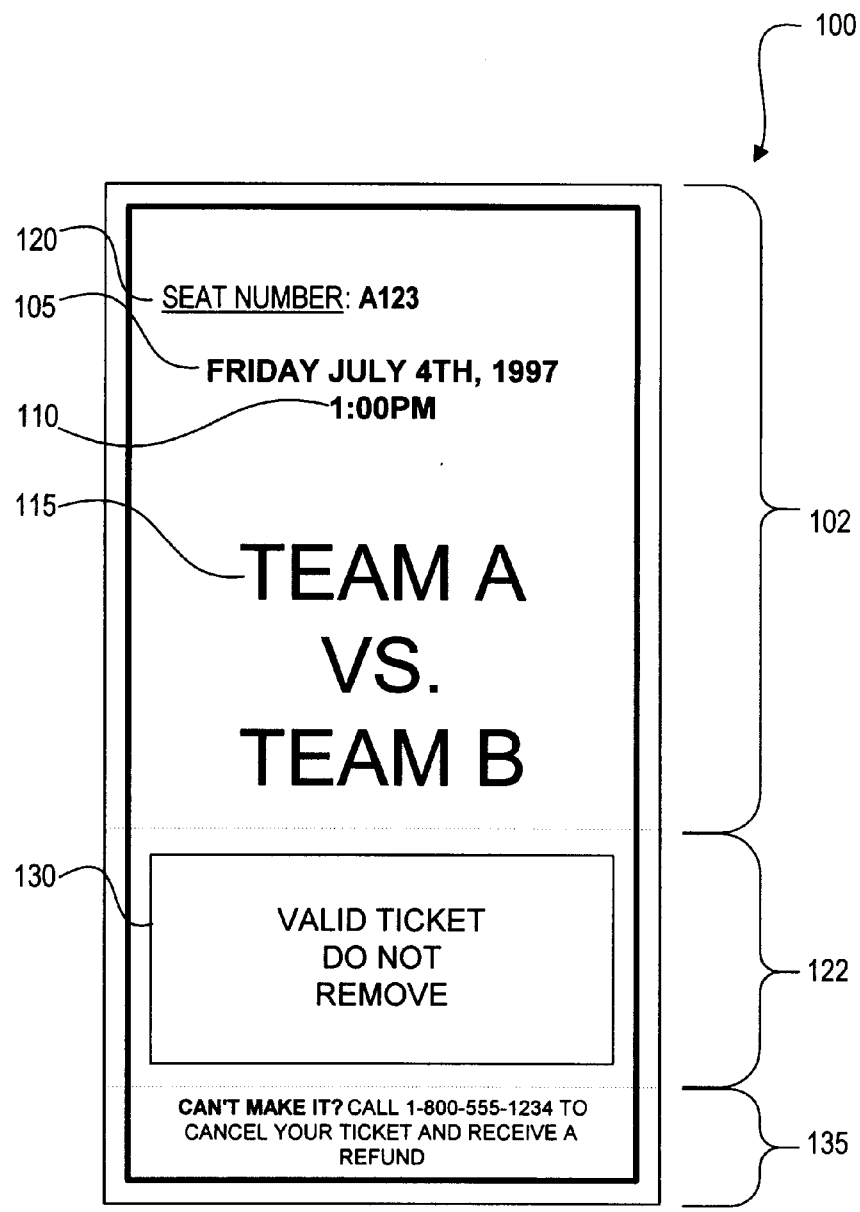
FIG. 1a depicts a ticket 100 in accordance with the present invention.

Referring to FIG. 1a, a venue is used to hold an event and an entity associated with the venue sells at least one ticket 100 to the event. A ticket holder desiring to attend the event purchases the ticket 100. The venue preferably is a physical space such as a stadium, arena, theater, movie theater, airplane, or the like. Alternatively, the venue may be a virtual space, such as a site on the World Wide Web of the Internet. The event is something that takes place in or at the venue. For example, a baseball game is an event that takes place in a baseball stadium.

When purchased, the ticket 100 affords the ticket holder a right to enter the venue during the event. The right is defined by indicia printed in an event description section 102 of the ticket 100. In the embodiment shown in FIG. 1a, such indicia include the date 105 on which the event is to take place and the time 110 at which the event is to begin. The indicia printed in the event description section 102 also include a brief description of the event 115 (for example, TEAM A vs. TEAM B). The ticket 100 also includes a location identifier 120 that identifies a space in the venue that the ticket holder holding the ticket 100 has the right to occupy during the event. In this example, the location identifier 120 is a seat number "A123."

The ticket 100 also includes a status section 122, which, as will be described in more detail below, is used to modify the ticket holder's right to enter the venue. The status section 122 includes an alterable area 130. The alterable area 130 is such that, when altered, it cannot easily be returned to its unaltered state. In one embodiment, the alterable area 130 is such that it hides other indicia that are printed under it on the ticket 100. In this embodiment, the alterable area 130 is made from a well-known scratch-off material, such as aluminum permeated latex, as is typically used on scratch-off lottery tickets. Alternatively, the alterable area 130 may be made of chemically reactive materials, such as those which wash-off, react to heat, react to light, or are watermarked. Further, the alterable area 130 may be made from a peel-off material, such as a sticker, perforated paper, or the like.

In one embodiment, the alterable area 130 has indicia printed on it which indicate that the ticket holder holding the ticket 100 has the right to enter the venue. For example, as shown in FIG. 1a, such indicia may indicate that the ticket 100 is a "VALID TICKET." The alterable area 130 also may include cautionary indicia, which instructs the ticket holder not to alter the alterable area 130. Such cautionary indicia may include the text "DO NOT REMOVE." Of course, other indicia may also be used as desired.

Normally, when the ticket 100 is purchased, the alterable area 130 hides indicia that modify the right of the ticket holder to enter the venue. Such indicia are made visible when the alterable area 130 is altered, for example, by scratching it off using a coin.

Figure 1B:
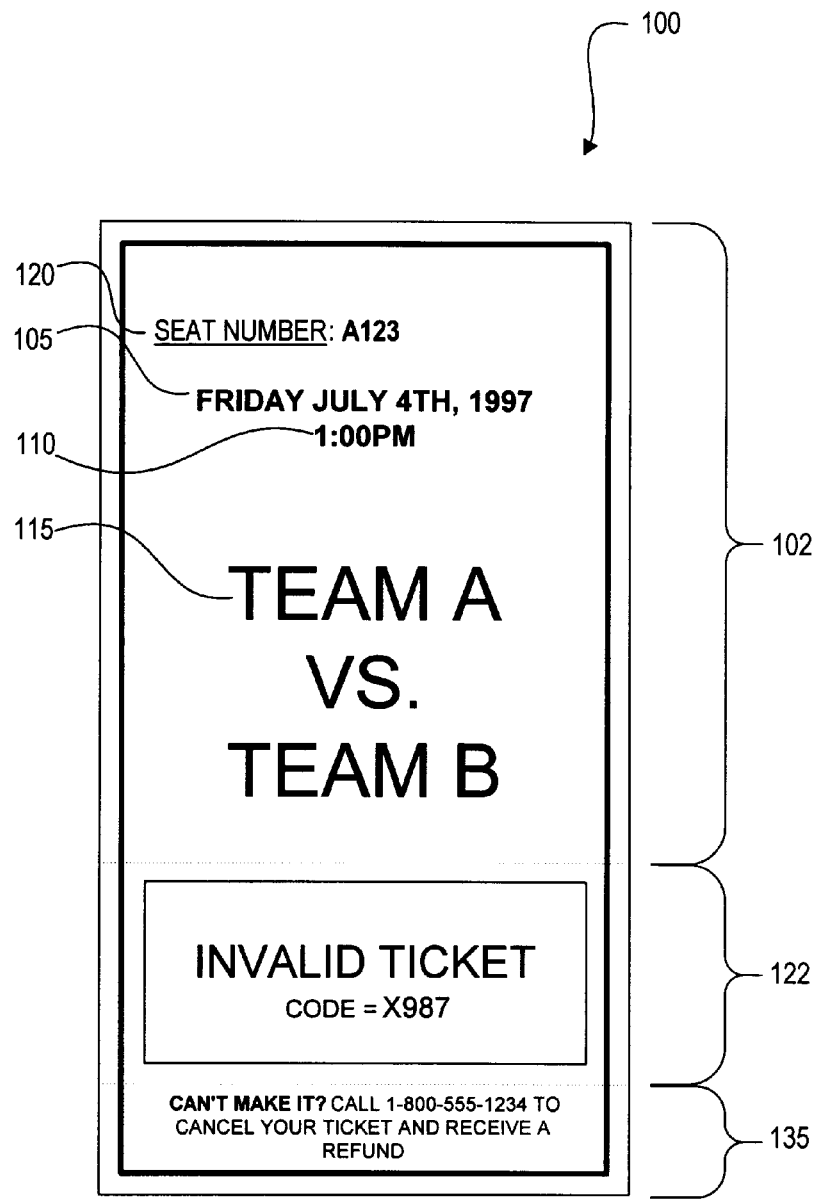
FIG. 1b depicts an altered ticket 100 in accordance with the present invention.

FIG. 1b depicts the ticket 100 after the alterable area 130 has been altered. As is shown, when the alterable area 130 is altered, the status section 122 includes indicia that modify the ticket holder's right to enter the venue. Such indicia may indicate that the ticket 100 is now an "INVALID TICKET." In one embodiment, the status section 122 also includes a code that is used by the ticket holder to obtain a refund for the ticket 100, without physically surrendering the ticket 100, as is further described below. The code is a value that can be communicated to the server 200. The code may be an alphabetical, numeric, or alphanumeric code. For example, as shown in FIG. 1b, the code is "X987." Of course, other indicia and codes may also be used as desired.

The ticket 100 may include an instruction section 135 providing instructions for the ticket holder as to how he may obtain a refund for the ticket 100. For example, in FIGS. 1a and 1b, the ticket 100 instructs the ticket holder to dial a telephone number 1-800-555-1234 in order to obtain a refund for the ticket 100. A method by which the ticket holder may obtain the refund for the ticket 100, without physically surrendering the ticket 100, is described in more detail below.

Figure 2:
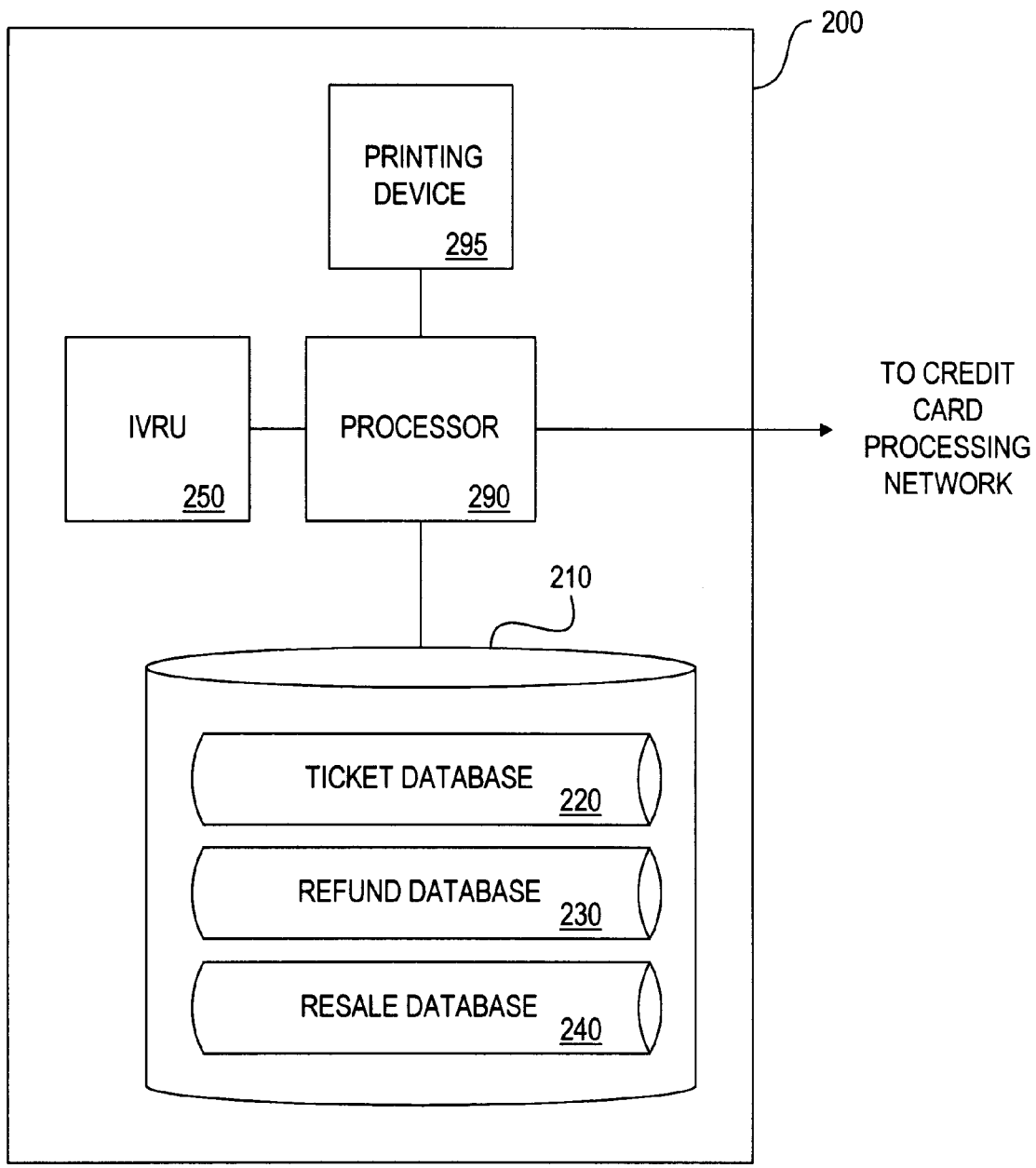
FIG. 2 depicts a diagrammatic view of a server 200.

Referring next to FIG. 2, a server 200 is shown which includes a memory 210 and at least one processor 290 in communication therewith. The processor 290 may be in communication with a credit card processing network which enables a refund to be provided to a ticket holder via the ticket holder's credit card, without requiring the ticket holder to physically surrender the ticket 100. The server 200 may also include an interactive voice response unit (IVRU) 250 in communication with the processor 290. In this way, the IVRU 250 provides a communication interface which enables a ticket holder to use a telephone to communicate with the server 200 via DTMF signals or using voice recognition technology. The server 200 may include a printing device 295 for printing tickets. Such IVRUs 250 and printing devices 295 are well known in the art and, therefore, are not further described here.

The memory 210 typically is a machine-readable media. Such media include, as is well known in the art, magnetic and/or optical media such as a hard disk, optical disk, floppy disk, tape, random access memory, read only memory, and/or any combination thereof. The memory 210 (or portions thereof) may reside on single computer, or may be distributed among multiple computers which may make up the server 200.

An embodiment of the memory 210 includes a ticket database 220. The memory 210 may also include a refund database 230 and a resale database 240. While the following description refers to specific databases, formats, records, and fields, those skilled in the art will readily appreciate that such specifics may be implemented in many different variations, forms, and embodiments.

Figure 3:
FIG. 3 depicts a diagrammatic view of a ticket database 220.

Referring now to FIG. 3, an embodiment of the ticket database 220 is depicted in detail. The ticket database 220 typically stores data relating to tickets 100 which have been sold to ticket holders by an entity selling tickets 100. The rows and columns of the ticket database 220 (and other databases described herein) represent records and fields of the ticket database 220, respectively. Of course, other records and fields in this and the other databases described herein may be used as desired.

As shown in FIG. 3, a record of the ticket database 220 is kept for each ticket 100 sold by the entity and includes the fields 220A–220D. The field 220A stores a location identifier for a ticket 100 that has been sold to a ticket holder. The location identifier stored in the field 220A corresponds to the location identifier 120 on the ticket 100. Thus, it identifies a space in the venue that the ticket holder holding the ticket 100 has the right to occupy. In one embodiment, the location identifier represents a particular seat in the venue.

The field 220B stores a status of a ticket 100 sold to a ticket holder. In one embodiment, the ticket status stored in the field 220B indicates that the ticket 100 is either "INVALID" or "VALID," corresponding to whether the alterable area 130 of the ticket 100 has been altered or not, respectively. If this ticket status indicates that the ticket 100 is "VALID," then the ticket holder holding the ticket 100 has the right to access the venue during the event. If this ticket status indicates that the ticket is "INVALID," then the ticket holder holding the ticket 100 does not have the right to access the venue.

Field 220C stores a code for a ticket 100. The code stored in the field 220C corresponds to the code normally hidden under the alterable area 130 on the ticket 100. It is used by a ticket holder in order to modify the right to access the venue conferred by the ticket 100 and to change the ticket status stored in the field 220B. In one embodiment, the code stored in the field 220C is used by the ticket holder to obtain a refund in exchange for modifying the right conferred by the ticket 100 to access the venue. The ticket database 220 may also include the field 220D which stores the original price ("face value") of the ticket 100 sold to the ticket holder.

Referring next to FIG. 4, an embodiment of the refund database 230 is depicted in detail. When used, the refund database 230 stores data which enables a ticket holder who has purchased a ticket 100 to obtain a refund without physically surrendering the ticket 100. As shown in FIG. 4, a record of the refund database 230 typically includes fields 230A–230D.

The field 230A stores a location identifier for a ticket 100 that has been sold to a ticket holder. The location identifier stored in the field 230A corresponds to the location identifier 120 on the ticket 100, and to the field 220A of the ticket database 220. The field 230B stores a refund factor. The refund factor is used to calculate an amount of money that will be refunded to the ticket holder for the ticket 100. In one embodiment, the refund factor stored in the field 230B is a percentage that is less than one hundred percent. Alternatively, the refund factor stored in the field 230B may be a monetary amount that indicates a handling fee to be charged for the refund of the ticket 100. The refund factor stored in the field 230B may be common for each ticket 100 or it may differ between tickets 100. The field 230C stores a monetary amount to be refunded to the ticket holder for the ticket 100 and is calculated based on the field 230B, as is described below.

The field 230D stores information relating to the ticket holder who is receiving a refund for the ticket 100. In one embodiment, the refund is issued to the ticket holder's credit card. Thus, the field 230D may include the name of the ticket holder, his credit card account number, and the expiration date of his credit card. Alternatively, the refund may be issued in the form of a check. In this instance, the field 230D may contain the name, street address, city, state, and zip code of the ticket holder.

FIG. 5 depicts an embodiment of the resale database 240 in detail. When used, the resale database 240 stores data which enables the right conferred by a ticket 100 to be resold to a second person in the form of a new ticket, after the right conferred by such ticket 100 has been modified. A record of the resale database 240 includes fields 240A–240B.

The field 240A stores a location identifier for a ticket 100 that has been redeemed by a ticket holder. The location identifier stored in the field 240A corresponds to the location identifier 120 on the ticket 100, and to the fields 220A and 230A. The field 240B stores a monetary amount for which a new ticket, conferring the same right as the ticket 100, will be resold to a second ticket holder. The resale amount stored in the field 240B may be made to vary according to the ticket holder demand for the event. Thus, for example, if the event is a popular sporting event such as the final game of a basketball championship series, the ticket holder demand to the event is likely to be high. In this case, the resale amount of the ticket 100 stored in the field 240B may reflect that the ticket 100 is to be sold for more than the original face value.

Figure 6:
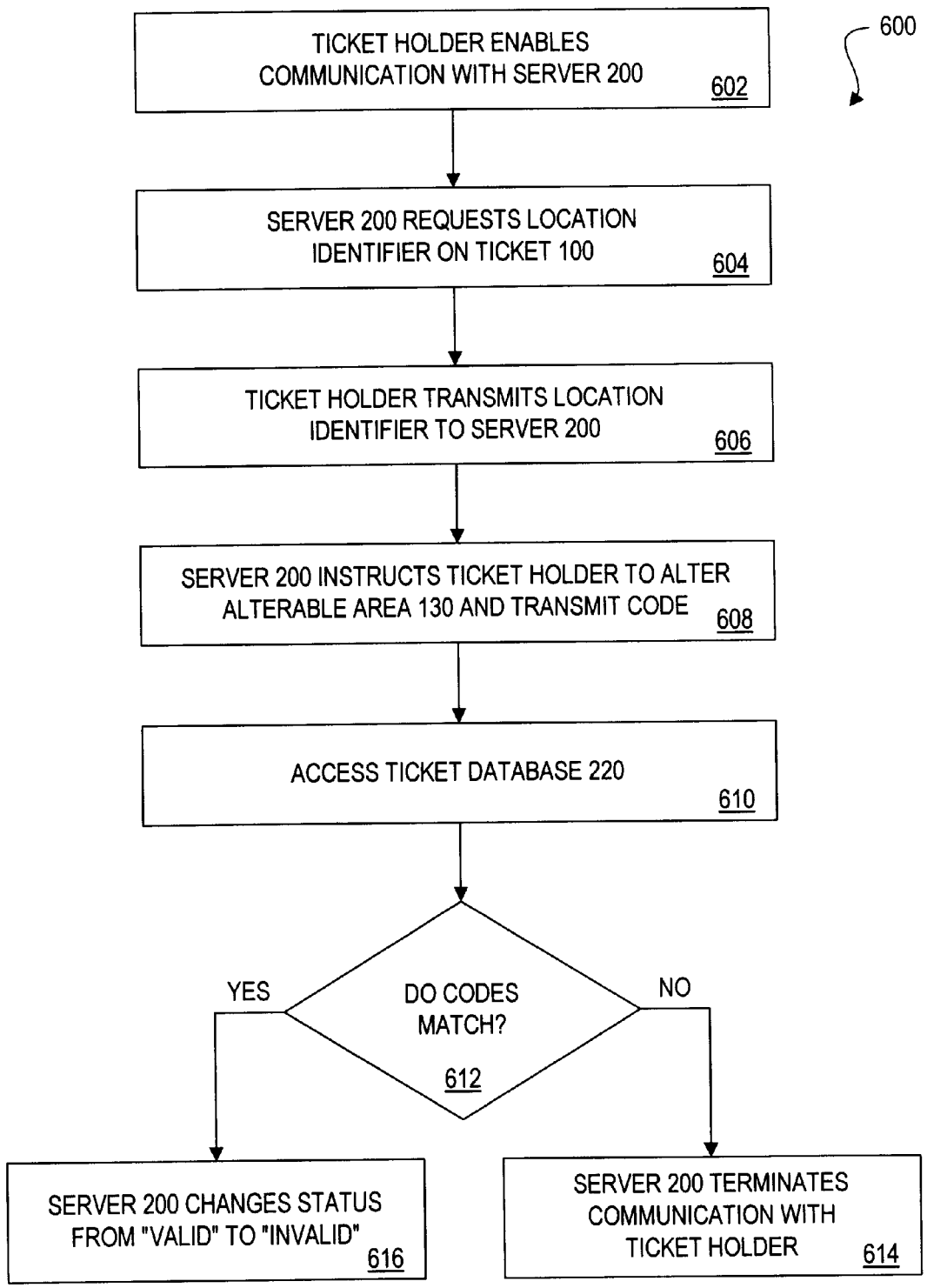
FIG. 6 is a flow chart depicting a process 600 for modifying the right confirmed by a ticket 100, without physically surrendering the ticket 100.

Referring next to FIG. 6, a process 600 for modifying the right afforded by a ticket 100, without physically surrendering the ticket 100 is described. The process 600 begins at step 602 where the ticket holder initiates communication with the server 200. In one embodiment, the ticket holder uses a device such as his telephone and dials the telephone number included in the instruction section 135 of the ticket 100. This telephone number will connect the ticket holder to the server 200 via its IVRU 250. Of course, the ticket holder may communicate in other suitable manners with the server 200, such as by using a computer, personal digital assistant (PDA), or other suitable device and/or communication channel.

At step 604, the server 200, via IVRU 250, requests that the ticket holder enter information that identifies the ticket 100 for which the right is to be modified. In the present embodiment, this information is the location identifier 120 of the ticket 100. Of course, other information, which identifies the ticket 100, may be requested by the server 200. At step 606, in response to the request of the server 200, the ticket holder transmits the location identifier 120 to the server 200 using a telephone.

Next, at step 608, the server 200, via the IVRU 250, instructs the ticket holder to alter the alterable area 130 of the ticket 100. Thus, using a coin or other suitable means, the ticket holder alters the alterable area 130, for example, by removing a latex covering. In the present embodiment, when the alterable area 130 is altered, the status section 122 of the ticket 100 indicates that the ticket 100 is now an "INVALID TICKET." In this embodiment, the normally hidden code is also revealed. As indicated in FIG. 1b, the exemplary code is "X987." The ticket holder is requested to transmit the revealed code to the server 200. The ticket holder then transmits the revealed code to the server 200 over the telephone.

Next, the server 200 determines whether the ticket holder is authorized to modify the right afforded by the ticket 100. To do this, at step 610, the server 200 retrieves the record in the ticket database 220 whose field 220A contains the location identifier transmitted by the ticket holder at step 606.

At step 612, the server 200 determines whether the code transmitted by the ticket holder at step 608 matches the code stored in the field 220C for the record retrieved at step 610. If the code transmitted at step 608 does not match the code stored in the field 220C, then processing proceeds to step 614. There, the server 200 informs the ticket holder that he is not authorized to modify the right associated with the ticket 100. In this case, the server 200 terminates communication with the ticket holder and the process 600 is complete.

If the code transmitted by the ticket holder at step 608 matches the code stored in the field 220C for the record retrieved at step 610. Processing proceeds to step 616 where the server 200 updates the ticket database 220 by changing the ticket status stored in the field 220B of the record accessed at step 610 from "VALID" to "INVALID." At this point, the process 600 is complete.

In view of the above, access to the venue may be controlled as follows. A ticket holder holding a ticket 100 approaches a gate at the venue. There, the ticket holder hands the ticket 100 to a ticket-taker who visually examines the ticket 100. The ticket-taker determines whether the alterable area 130 has been altered in which case the status section 122 would indicate that the ticket 100 is an "INVALID TICKET." If the alterable area 130 has been altered, the ticket holder is denied access to the venue. If the alterable area 130 has not been altered, then the status section 122 indicates that the ticket 100 is a "VALID TICKET." In this case, the ticket-taker determines whether the indicia printed in event description section 102 of the ticket 100 (the date, time, and description of the event) matches the current date, time and event which presently is being held at the venue. If they do match, then the ticket holder is permitted access to the venue. If they do not match, the ticket holder is denied access to the venue.

Figure 7:
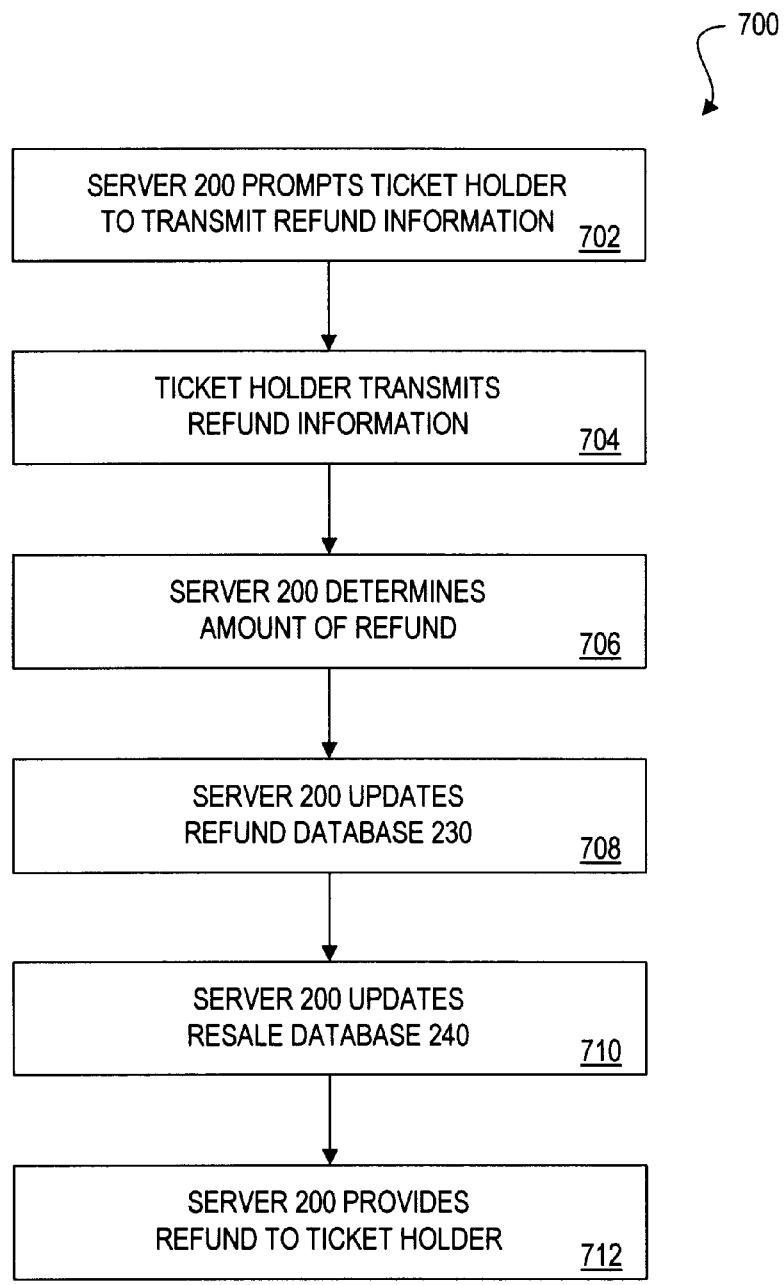
FIG. 7 is a flow chart depicting a process 700 for enabling a ticket holder to obtain a refund for a ticket 100, without physically surrendering the ticket 100.

As stated above, a feature and advantage of the present invention is that the ticket holder can receive a refund for the ticket 100 without physically surrendering the ticket 100. FIG. 7 is a flow chart depicting a process 700 by which a ticket holder can obtain such a refund. In one embodiment, the process 700 is used after completion of the process 600. Thus, at step 702, the server 200, via the IVRU 250, prompts the ticket holder to transmit information which will enable a refund to be provided to the ticket holder. In this embodiment, the refund is issued to the ticket holder's credit card account. In this case, the server 200 prompts the ticket holder to transmit refund information, including his name, his credit card account number, and the expiration date of his credit card. Alternatively, if the refund is to be issued by check, the ticket holder might be prompted to provide his name, street address, city, state, and zip code. At step 704, the ticket holder transmits the information requested at step 702, for example, using his telephone.

At step 706, the server 200 determines the amount to be refunded to the ticket holder. In the present embodiment, the server 200 reads the ticket price stored in the field 220D for the record that was retrieved at step 610 of the process 600. The server 200 also retrieves the corresponding location identifier provided by the ticket holder at step 606. The server 200 reads the refund factor from the field 230B, which typically is a percentage that is less than one hundred percent. To determine the amount to be refunded, the server 200 multiplies the ticket price stored in the field 220D by the refund factor stored in the field 230B. The result of this multiplication represents the amount to be refunded to the ticket holder. In accordance with a feature of the present invention, the refund factor may be made to vary in accordance with the time at which the server 200 receives the code transmitted at step 608. Thus, the refund factor may be a lower percentage on the day of the event as compared to a week before the event. The refund may also be made to vary in accordance with actual or projected demand to an event or the class of the ticket 100 (e.g., box, mezzanine, upper deck) for which a refund is to be issued. The ticket classes are described in more detail below.

At step 708, the server 200 updates the refund database 230. More specifically, the amount to be refunded to the ticket holder is stored in the field 230C. Also, the refund information provided by the customer at step 704 is stored in the field 230D.

Next, at step 710, the server 200 updates the resale database 240 which enables a new ticket, conferring the same right as the ticket 100 which has been modified, to be sold to a second person. Thus, the server 200 creates a new record in the resale database 240. The location identifier transmitted at step 606 is stored in the field 240A of the new record. The ticket printing device 295 may be used to print a new ticket which will be sold to a second ticket holder. The new ticket may be a conventional ticket, such as that which is currently used in the prior art.

The server 200 also calculates a price for which the new ticket will be resold. In one embodiment, the server 200 reads the ticket price stored in the field 220D for the record retrieved at step 610. In the present embodiment, the ticket will be resold for the price indicated in the field 220D. Therefore, the ticket price stored in the field 220D is copied to the field 240B. Of course, the ticket that is being resold need not be sold for the same price as the original ticket. The ticket price stored in the field 220D may be multiplied by a discount factor less than one hundred percent (or a premium factor exceeding one hundred percent) and the result of such multiplication may be stored in the field 240B.

Processing then continues at step 712 where the server 200 provides a refund to the ticket holder. In the present embodiment, the refund is issued to the ticket holder's credit card account. The server 200 thus reads the refund information stored in the field 230D and authorizes the refund via a conventional credit card processing network, as those known in the art such as First Data Corporation. Alternatively, the refund may be provided by check. In this instance, the server 200 reads the refund information stored in the field 230D and generates the check that can be mailed to the ticket holder. The process 700 then is complete. Thus, using the process 700, a ticket holder may receive a refund for the ticket 100, without physically surrendering the ticket 100.

Referring next to FIGS. 8–13, an embodiment for remotely managing the upgrade of rights to an event is described. According to this embodiment, a ticket holder may improve his seat for an event by upgrading a ticket 800 that he holds for the event. Of course, the following description may be modified by one skilled in the art to accommodate ticket downgrades as well.

Figure 8A:
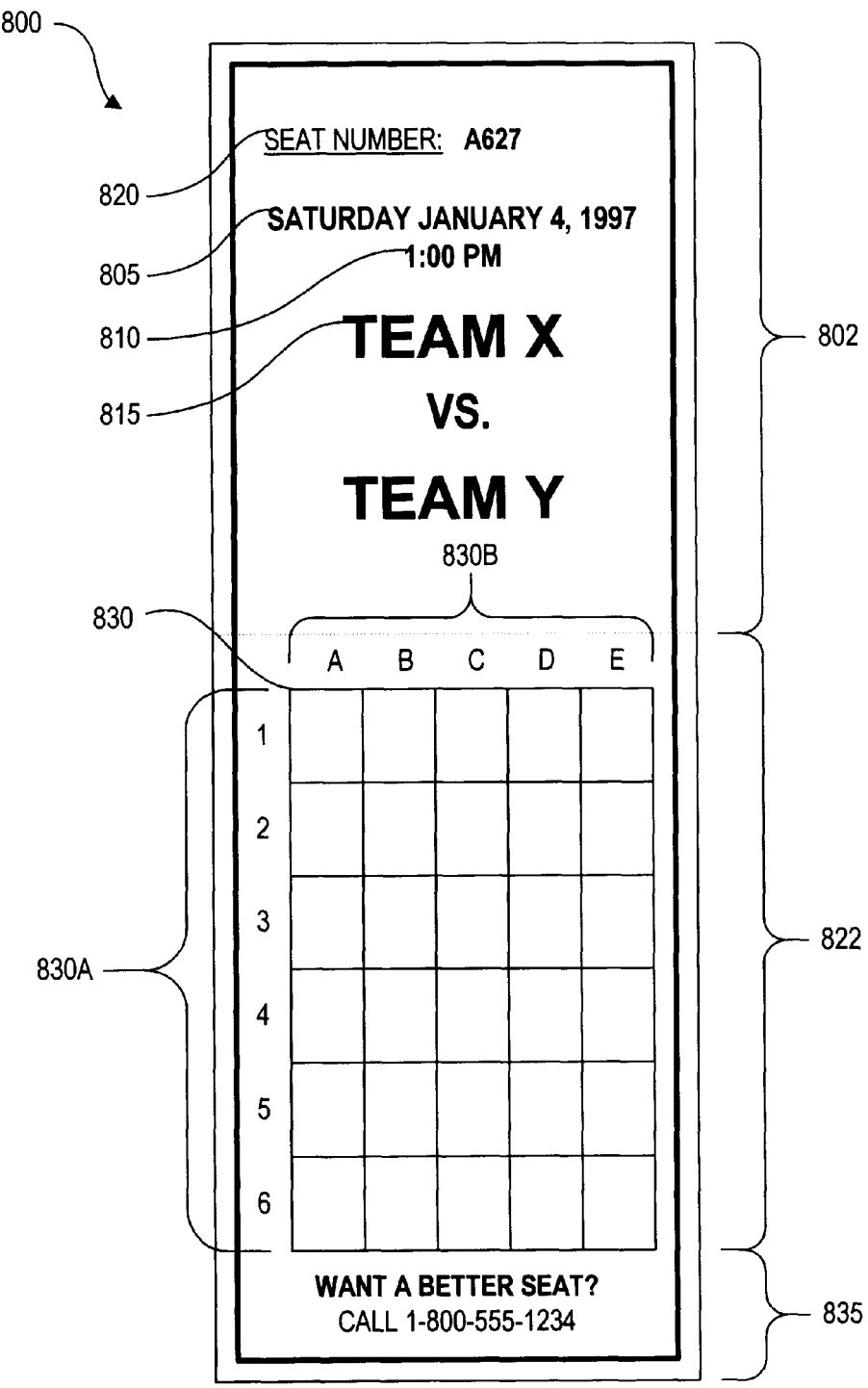
FIG. 8a depicts a ticket 800 in accordance with the present invention before it has been upgraded.

FIG. 8a depicts an embodiment of a ticket 800 as it is normally sold to a ticket holder and before it has been upgraded. The ticket 800 normally entitles a ticket holder holding it to a right to occupy a particular space in the venue during an event. The right is defined by indicia printed in an event description section 802 of the ticket 800. In the embodiment shown in FIG. 8a, such indicia include the date 805 on which the event is to take place and the time 810 at which the event is to begin. The indicia printed in the event description section 802 also include a brief description of the event 815 (for example, TEAM X vs. TEAM Y). The ticket 800 also includes a location identifier 820 that identifies the space in the venue that the ticket holder holding the ticket 800 has the right to occupy during the event. In this example, the location identifier 820 is a seat number "A627."

The ticket 800 also includes a status section 822 which, as will be described in more detail below, is used by the ticket holder to upgrade his seat. The status section 822 includes an alterable area 830. The alterable area 830 is such that, when altered, it cannot easily be returned to its unaltered state. In one embodiment, the alterable area 830 is in the form of a grid having a plurality of rows 830A and columns 830B. In this embodiment, the alterable area 830 is such that it hides other indicia that are printed under it on the ticket 800.

In the present embodiment, to upgrade the ticket 800, the ticket holder alters one cell (defined by a particular row 830A and column 830B) from the grid. Of course, the alterable area may comprise a single column or row of cells, or may comprise a single cell. In this embodiment, the alterable area 830 is made from a well-known scratch-off, wash-off, or a peel-off material, such as those described above.

Figure 8B:
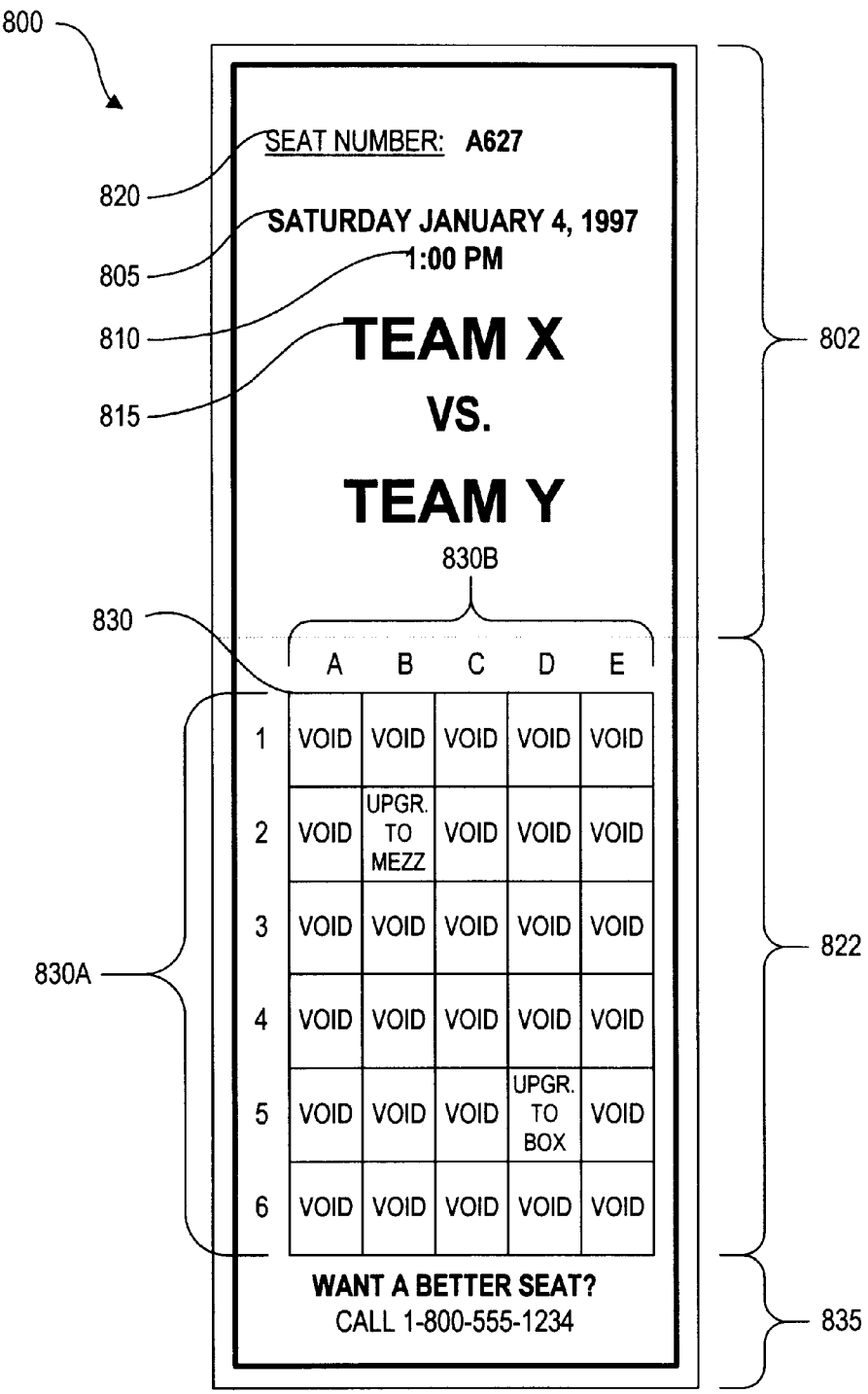
FIG. 8b depicts a ticket 800 in accordance with the present invention with the alterable area fully altered.

FIG. 8b depicts the ticket 800 with the alterable area 830 fully altered. As is seen there, when the alterable area 830 is fully altered, the status section 822 includes indicia which indicate either that the ticket 800 is "VOID" or that it has been "UPGRADED" to another class such as "Mezzanine" or "Box" as indicated in cells B2 and D5, respectively. Of course, other indicia may also be used as desired.

As is readily seen in FIG. 8b, the number of cells containing the indicia "VOID" has been chosen to greatly outnumber the cell(s) including the indicia "UPGRADED." This is to deter the ticket holder from trying to "guess" which cell(s) include the indicia "UPGRADED" because, if he guesses incorrectly, the ticket 800 becomes "VOID."

The ticket 800 may include an instruction section 835 providing instructions for the ticket holder to upgrade the ticket 800. For example, in FIGS. 8a and 8b, the ticket 800 instructs the ticket holder to dial a telephone number 1-800-555-1234 in order to upgrade the ticket 800. A process for enabling the ticket holder to upgrade the ticket 800 is described in detail below.

Figure 9:
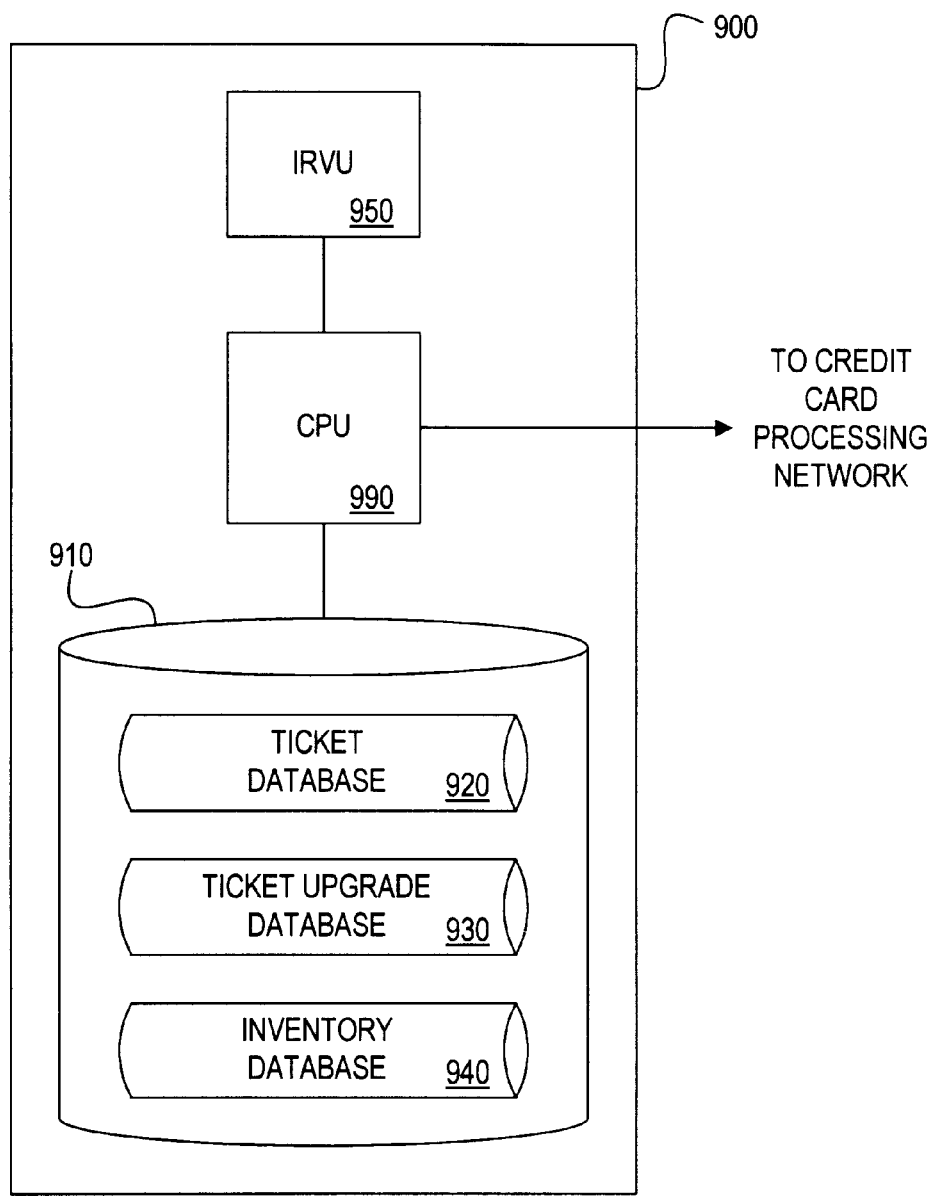
FIG. 9 depicts a diagrammatic view of a server 900.

Referring next to FIG. 9, the server 900 of this embodiment is shown in detail. The server 900 typically includes a memory 910 and at least one processor 990 in communication therewith. The server 900 may also include an interactive voice response unit (IVRU) 950 in communication with the processor 990. In this way, the IVRU 950 provides a communication interface that enables a ticket holder to use his telephone to communicate with the server 900. The IVRU 950 is well known in the art and, therefore, is not further described here. The server 900 may also communicate with a conventional credit card processing network so that an upgrade may be paid for using the ticket holder's credit card.

The memory 910 typically is a machine-readable media. Such media include, as is well known in the art, magnetic and/or optical media such as a hard disk, optical disk, floppy disk, tape, random access memory, read only memory, and/or any combination thereof. The memory 910 (or portions thereof) may reside on a single computer, or may be distributed among multiple computers which may make up the server 900.

In one embodiment, the memory 910 includes a ticket database 920, a ticket upgrade database 930, and an inventory database 940. While the following description refers to specific databases, formats, records, and fields, those skilled in the art will readily appreciate that such specifics may be implemented in many different variations, forms, and embodiments.

Referring now to FIG. 10, the ticket database 920 is depicted in detail and is seen to store data relating to tickets 800 which have been sold to ticket holders by an entity selling tickets to events at the venue. As shown in FIG. 10, a record of the ticket database 920 is kept for each ticket 800 sold by the entity and includes the fields 920A–920D. The field 920A stores a location identifier for a ticket 800 that has been sold to a ticket holder. The location identifier stored in the field 920A corresponds to the location identifier 820 on the ticket 800. Thus, it identifies a space in the venue, such as a seat, which the ticket holder holding the ticket 800 has the right to occupy.

The field 920B stores an upgrade status of a ticket 800 sold to a ticket holder. In one embodiment, the ticket status stored in the field 920B indicates that the ticket 800 has been "UPGRADED" or "NOT UPGRADED." If this ticket status indicates that the ticket 800 has been "UPGRADED," then the ticket holder has upgraded the ticket 800. If this ticket status indicates that the ticket is "NOT UPGRADED," then the ticket holder has not upgraded the ticket 800. When the ticket 800 is originally sold to the ticket holder, the field 920B indicates that the ticket 800 is "NOT UPGRADED."

The field 920C stores a ticket class for a ticket 800 that has been sold to a ticket holder. The ticket class represents a category of seats in the venue. For example, such ticket classes may include box seats, mezzanine seats, upper deck seats, and the like. In one embodiment, the ticket classes have relative values. For example, a box seat is more valuable than a mezzanine seat and an upper deck seat, and a mezzanine seat is more valuable than an upper deck seat. The field 920C indicates the ticket class corresponding to the location identifier 820 of the ticket 800 when it is originally sold to the ticket holder.

The field 920D stores a cell locator. The cell locator indicates a cell of the alterable area 830 which, when altered, reveals that the ticket 800 has been "UPGRADED." In the present embodiment in which the alterable area 830 is in the form of a grid, the cell locator comprises a column and row of the grid which, when altered, reveals that the ticket 800 has been "UPGRADED."

Referring next to FIG. 11, the ticket upgrade database 930 is depicted in detail and is seen to store data which indicates the types of upgrades available at the venue and the cost of such upgrades. As shown in FIG. 11, a record of the ticket upgrade database 930 typically includes fields 930A–930B.

The fields 930A and 930B store values which indicate a type of upgrade and a cost of the upgrade, respectively. For example, the venue may permit an upgrade from an upper deck seat to a mezzanine seat. In this case, as shown in FIG. 11, the field 930A may indicate "UPPER DECK TO MEZZANINE" and the field 930B may indicate that the cost of such an upgrade is "$10.00." Similarly, the venue may permit an upgrade from "UPPER DECK TO BOX" seats and from "MEZZANINE TO BOX" seats and may charge varying prices for these upgrades, as indicated in FIG. 11.

FIG. 12 depicts the inventory database 940 in detail. The inventory database 940 stores data that indicates the seats to which a ticket holder may purchase an upgrade. A record of the inventory database 940 includes fields 940A–940B. The field 940A stores a location identifier for a seat to which the ticket holder may purchase an upgrade. The field 940B stores the ticket class corresponding to the location identifier stored in the field 940A. For example, in FIG. 12, the seat having the location identifier "AB16" is a box seat to which a ticket holder may purchase an upgrade.

Figure 13A:
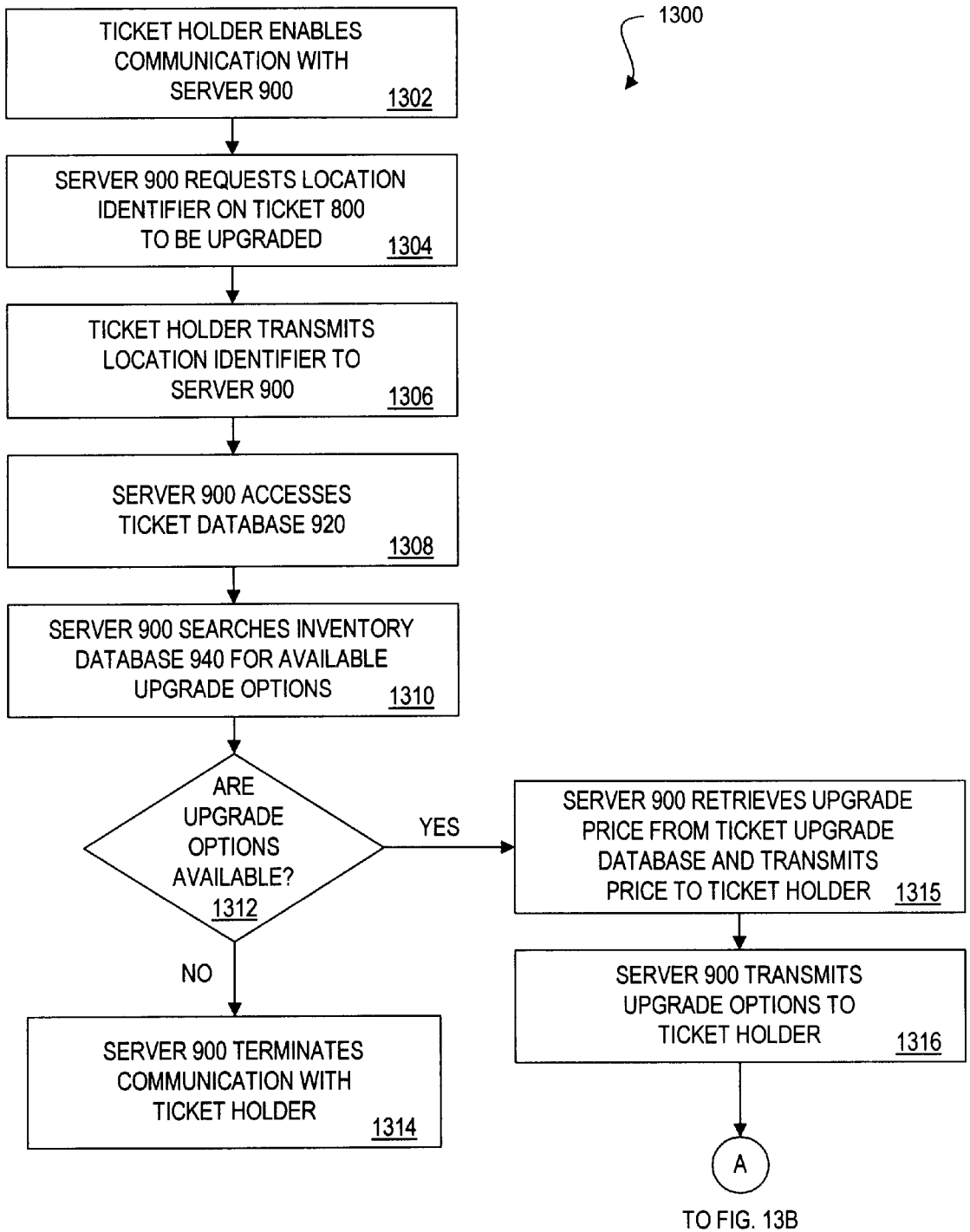
FIG. 13a is a flow chart depicting a process 1300 for enabling a ticket holder to upgrade a ticket 800, without physically surrendering the ticket 800.
Figure 13B:
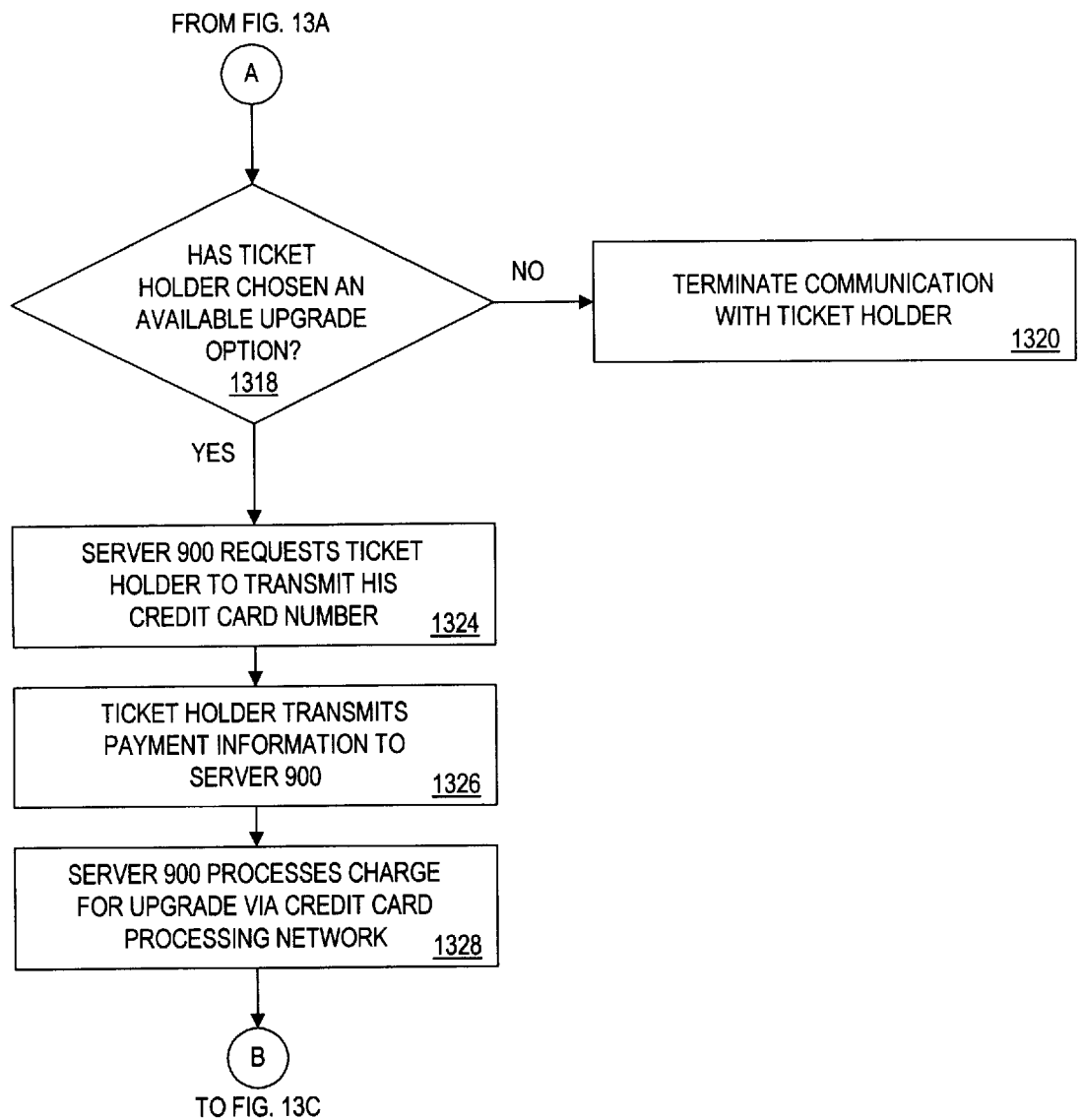
FIG. 13b is a continuation of the flow chart of FIG. 13a depicting a process 1300 for enabling a ticket holder to upgrade a ticket 800, without physically surrendering the ticket 800.
Figure 13C:
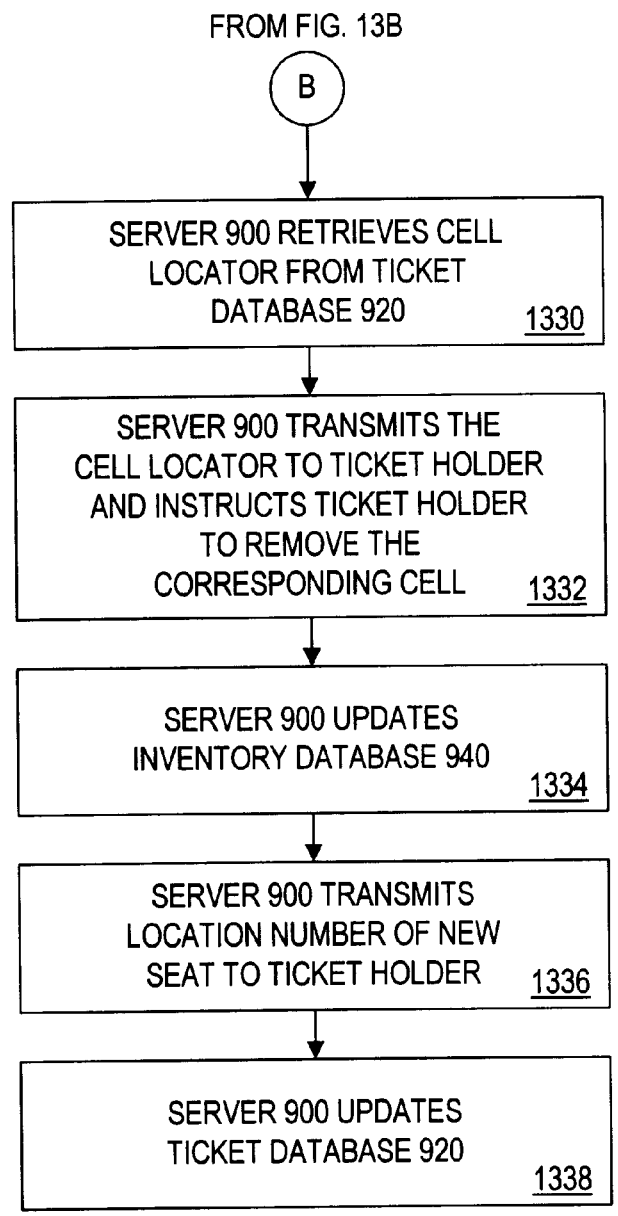
FIG. 13c is a continuation of the flow chart of FIG. 13b depicting a process 1300 for enabling a ticket holder to upgrade a ticket 800, without physically surrendering the ticket 800.

Referring next to FIG. 13, a process 1300 for enabling a ticket holder to upgrade a ticket 800 is described. The process 1300 begins at step 1302 where the ticket holder establishes communication with the server 900. In the present embodiment, the ticket holder uses a telephone and dials the telephone number indicated in instruction section 835 of the ticket 800. This telephone number connects the ticket holder to the server 900 via its IVRU 950. Of course, the ticket holder may communicate in other manners with the server 900, such as by using a computer, personal digital assistant (PDA), or other suitable device and/or other communication channel.

At step 1304, the server 900 requests that the ticket holder provide information that identifies the ticket 800 that is to be upgraded. In one embodiment, the server 900 requests that the ticket holder enter the location identifier 820 of the ticket 800 which is to be upgraded. Of course, other information that identifies the ticket 800 which is to be upgraded may be requested by the server 900. At step 1306, in response to the request of the server 900 at step 1304, the ticket holder transmits the location identifier 820 to the server 900 using his telephone.

At step 1308, the server 900 retrieves a record in the ticket database 920 whose field 920A contains the location number transmitted by the ticket holder at step 1306. The server 900 determines whether there are upgrades available for the ticket 800. Thus, at step 1310, the server 900 reads the ticket class from the field 920C for the record retrieved at step 1308. The server 900 searches the field 940B of the inventory database 940 for records which indicate a ticket class which is more valuable than the ticket class indicated by the field 920C. If there are such more valuable ticket classes, the server 900 tracks the location identifiers of the seats to which the ticket holder may purchase an upgrade and the classes of the upgrades.

At step 1312, the result of the search performed at step 1310 is analyzed. Thus, if it was determined at step 1310 that field 940B of the inventory database 940 includes records for ticket classes which are more valuable than the ticket class indicated by the field 920C, then processing continues at step 1314. There, the server 900 informs the ticket holder that upgrades are not available for the ticket 800. In this case, the server 900 terminates communication with the ticket holder and the process 1300 is complete.

If at step 1312 it was determined at step 1310 that field 940B of the inventory database 940 includes records for ticket classes which are more valuable than the ticket class indicated by the field 920C, then processing continues at step 1315. There, the server 900 determines the cost of the available upgrades. To do this, the server 900 searches the ticket upgrade database 930 for the available upgrades. As FIG. 11 illustrates, the cost of the available upgrades range "$10.00," "$35.00" and "$20.00" for the exemplary upgrades indicated in the figure. The server 900, via the IVRU 950, transmits the cost of the available upgrades to the ticket holder.

At step 1316, the server 900 instructs the ticket holder to select one of the available upgrades. For example, if the ticket 800 has a ticket class equal to "UPPER DECK," then the server 900, via the IVRU 950, may transmit a list of available upgrades and prices to the ticket holder as follows: "To upgrade from your upper deck seat to a mezzanine seat for $10, press 1. To upgrade from your upper deck seat to a box seat for $35, press 2. If you do not wish to upgrade at this time, press 0."

At step 1318 (FIG. 13b), the server 900 determines whether the ticket holder has selected an available upgrade from those presented at step 1316. Thus, if the ticket holder entered "0" at step 1316, then processing continues at step 1320 where the server 900, via the IVRU 950, confirms that the ticket holder has chosen not to upgrade his ticket 800 and terminates communication with the ticket holder. In this case, the process 1300 is complete. If the ticket holder has entered a "1" or a "2" at step 1316, then he has selected an available upgrade. In this case, processing continues at step 1324.

At step 1324, the server 900 requests that the ticket holder pay for the upgrade. In one embodiment, the server 900 accepts payment via the ticket holder's credit card. In such a case, the server 900 prompts the ticket holder to transmit his name, credit card account number and the expiration date of his credit card. The ticket holder transmits this information to the server 900 using his telephone at step 1326.

Processing then continues at step 1328. There, the server 900 processes the charge for the upgrade using the information received at step 1326. In a preferred embodiment, this is done via a conventional credit card processing network, according to techniques that are well known in the art.

Figure 8C:
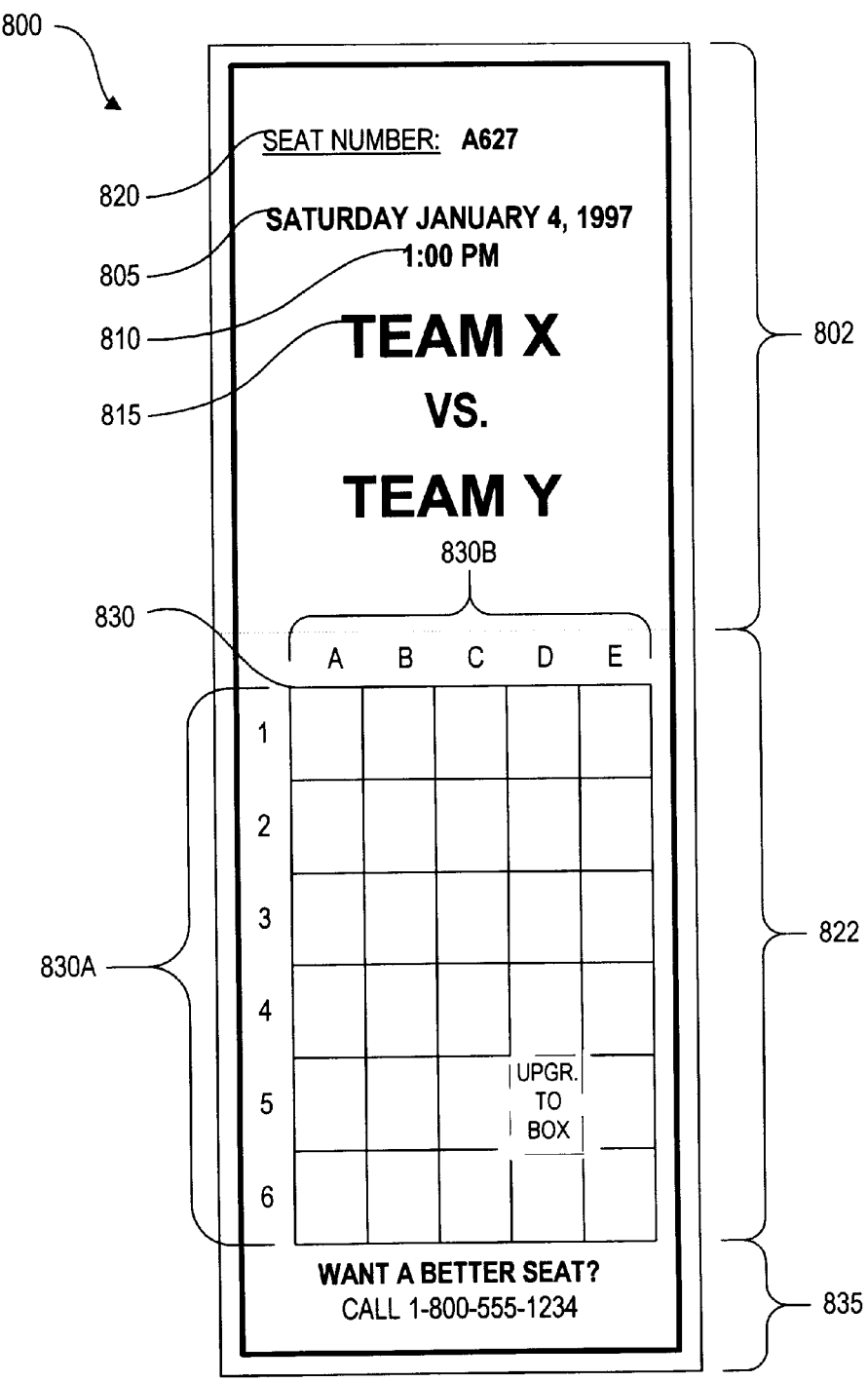
FIG. 8c depicts a ticket 800 after it has been altered to be upgraded in accordance with the present invention.

Next, the ticket 800 is altered to reflect the upgrade. To do this, at step 1330 of FIG. 13c, the server 900 retrieves the cell locator 920D from the record of the ticket database 920 retrieved at step 1308. At step 1332, the server transmits instructions to the ticket holder to alter the cell indicated by the retrieved cell locator, for example, by removing a latex covering. To illustrate, the server 900 may retrieve a cell locator equal to "D5." In this case, the server 900 may instruct the ticket holder as follows: "To validate your upgrade, alter the cell corresponding to column D, row 5 of your ticket." As depicted in FIG. 8c, when the ticket holder follows these instructions, and alters the cell at D5, the word "UPGRADED" is revealed, as is the class ("BOX") to which the ticket holder has purchased an upgrade. If the ticket holder alters another cell, the word "VOID" is revealed. In this latter case, the ticket 800 becomes void and thus may not be used for admission into the venue.

At step 1334, the server 900 updates the inventory database 940. More specifically, in one embodiment, the server removes the record in the inventory database that corresponds to the upgrade purchased by the ticket holder. At step 1336, the server 900 transmits the location identifier of the seat to which the ticket holder has upgraded to the ticket holder. The ticket 800 may be provided with a space so that the ticket holder may write the location identifier received from the server 900. At step 1338, the server 900 updates the ticket database 920. To do this, the upgrade status stored in the field 920B is changed from "NOT UPGRADED" to "UPGRADED." The process 1300 then is complete. Thus, using the process 1300, access within a venue may be controlled by permitting a ticket holder to improve his seat for event by upgrading a ticket 800 which he holds for the event without physically surrendering the original ticket 800.

As described above, the present invention provides a ticket that can be altered by a ticket holder to obtain a refund or an upgrade. Because the ticket is altered, the ticket holder need not physically surrender the ticket to another entity in order to obtain the refund or upgrade. In this way, the problems associated with the services and programs of the prior art which require physically surrendering the ticket for such refunds or upgrades are overcome.

Further, because the present invention permits a ticket holder to obtain a refund or upgrade easily, such ticket holders are more likely to purchase tickets to events. Thus, the entities selling such tickets are likely to realize increased revenues.

Additionally, because the ticket is altered, access to the venue can be controlled simply by visually inspecting the ticket. There is no need for a sophisticated and expensive computer systems at the point of admission to the venue, such as those that are used in the prior art.

Although the particular embodiments shown and described above will prove to be useful in many applications relating to the arts to which the present invention pertains, further modifications of the present invention herein disclosed will occur to persons skilled in the art. All such modifications are deemed to be within the scope and spirit of the present invention as defined by the appended claims.

We claim:

1. A system for monitoring a status of a right to access a venue, wherein the system has a ticket associated therewith which confers the right to access the venue, and wherein the ticket has a normally hidden code associated therewith, the system comprising:

a memory having status data corresponding to the right to access the venue and data corresponding to the code; and a processor in communication with the memory, wherein the processor is operative to receive the code and to alter the status data based on the received code and the data corresponding to the code so that the status is monitored.

2. The system of claim 1, wherein when the status data is altered, the status data indicates that a holder of the ticket is not entitled to access the venue.

3. The system of claim 1, wherein the processor is further operative to calculate a refund to a holder holding the ticket when the status data is altered.

4. The system of claim 3, wherein the ticket has a class associated therewith, and wherein the refund is based on the class of the ticket.

5. The system of claim 1, wherein the processor is further operative to output instructions for altering the ticket to obtain the code.

6. The system of claim 3, wherein the refund is calculated based on when the code is received by the processor.

7. The system of claim 3, wherein the venue has an event associated therewith, and wherein the refund is calculated based on demand to the event.

8. The system of claim 1, wherein the processor is further operative to enable a sale of the right to a second person when the status data is altered.

9. A system for monitoring a status of a right to access a venue, comprising:

a memory having status data corresponding to the right to access the venue and data corresponding to a normally hidden code; and a processor in communication with the memory, wherein the processor is operative to receive the code, to alter the status data based on the received code and the data corresponding to the code, and to output instructions for accessing the code so that the status is monitored.

10. The system of claim 9, wherein when the status data is altered, the right to access the venue is modified.

11. A method for monitoring a status of a right to access a venue, wherein the venue has a server associated therewith, the method comprising the steps of:

issuing a ticket to a holder, wherein the ticket confers a right to access the venue, wherein the ticket has a normally hidden code associated therewith;

receiving the code by the server from the holder; and altering the right to access the venue by the server based on the received code.

12. The method of claim 11, wherein when the code is received, the holder is not entitled to access the venue.

13. The method of claim 12, wherein the server includes status data indicative of the right to access the venue and wherein the step of altering the right to access the venue comprises the step of altering the status data by the server.

14. A method for enabling an entity to provide a refund to a holder holding a ticket, and wherein the entity has a server associated therewith, comprising the steps of:

issuing the ticket by the entity to the holder, wherein the ticket has a normally hidden code associated therewith; and receiving the code by the server from the holder so that the refund can be provided to the holder.

15. The method of claim 14, wherein the holder has an account associated therewith, and wherein the method further comprises the steps of:

transmitting data indicating the account from the holder to the server; and providing the refund to the account of the holder.

16. The method of claim 14, wherein the value of the refund is calculated based on when the code is received by the server.

17. The method of claim 14, wherein the ticket has a class associated therewith, and wherein the value of the refund is based on the class of the ticket.

18. The method of claim 14, wherein the venue has an event associated therewith, and wherein the value of the refund is calculated based on demand to the event.

19. A method for controlling access to a venue, comprising the steps of:

receiving a ticket, wherein the ticket normally represents a right to access the venue, and wherein the ticket includes indicia which, when visible, indicate that the right to access the venue has been modified;

examining the ticket to determine whether the ticket represents the right or the modified right; and controlling access to the venue based on the right or the modified right.

20. The method of claim 19, wherein the indicia is normally covered by an alterable area, and wherein the indicia is visible when the alterable area is altered.

21. An article of manufacture, comprising:

first indicia entitling a holder of the article to a right to enter a venue; and second indicia for modifying the right, wherein the second indicia is normally hidden under an alterable area so that when the alterable area is altered, the right to enter the venue is modified.

22. The article of manufacture of claim 21, wherein the alterable area comprises a scratch-off material.

23. The article of manufacture of claim 21, wherein the alterable area comprises an aluminum permeated latex material.

24. A method for enabling a holder to upgrade a ticket, wherein the ticket has normally hidden upgrade indicia associated therewith, and wherein the holder is in communication with a server, the method comprising the steps of:

receiving a request to upgrade the ticket by the server from the holder;

transmitting a signal from the server to the holder, wherein the signal indicates a location of the normally hidden upgrade indicia; and transmitting instructions to alter the location indicated by the signal to the holder from the server to the holder so that the ticket can be upgraded.

25. The method of claim 24, wherein the signal indicates one of a plurality of cells.

26. The method of claim 24, wherein the signal indicates a cell defined by one of a plurality of columns and one of a plurality of rows.

27. The method of claim 26, wherein the location indicated by the signal corresponds to one of said plurality of columns and one of said plurality of rows.

28. The method of claim 26, wherein the instructions direct the holder to remove a scratch-off material.

29. The method of claim 24, further comprising the step of transmitting data indicative of a seat which reflects the upgrade to the device by the server.

30. An article of manufacture, comprising:

first indicia entitling a holder holding the article to a right to occupy a first location in a venue; and second indicia for modifying the right, wherein the second indicia is normally hidden under at least a portion of an alterable area;

so that when the portion of the alterable area is altered, the holder is entitled to occupy a second location in the venue.

31. The article of manufacture of claim 30, wherein the alterable area comprises a plurality of cells.

32. The article of manufacture of claim 30, wherein the alterable area comprises a plurality of columns and a plurality of rows.

33. The article of manufacture of claim 32, wherein the second indicia is located under one of said plurality of columns and one of said plurality of rows.

34. The article of manufacture of claim 30, wherein the alterable area comprises a scratch-off material.

35. The article of manufacture of claim 34, wherein the alterable area comprises an aluminum permeated latex material.

36. A system for enabling a holder to upgrade a ticket to a venue, wherein the ticket confers a right to occupy a location in the venue, wherein the ticket has normally hidden upgrade indicia associated therewith, and wherein the normally hidden upgrade indicia have a location on the ticket associated therewith, the system comprising:

a memory having data indicating the ticket to be upgraded, status data corresponding to a status of an upgrade of the ticket, and a location code corresponding to the location of the upgrade indicia on the ticket; and a processor in communication with the memory, wherein the processor is operative to receive a signal indicative of the ticket to be upgraded, to retrieve the location code based on the received signal and the data indicating the ticket to be upgraded, and to transmit the location code to the holder.

37. The system of claim 36, wherein the holder has an account associated therewith, and wherein the processor is further operative to receive data indicative of the account so that the holder may pay for the upgrade.

38. The system of claim 36, wherein the processor is further operative to output instructions to the holder to alter the location on the ticket corresponding to the location code so that the normally hidden upgrade indicia are revealed.

39. The system of claim 38, wherein the instructions include directing the holder to alter one of a plurality of cells.

40. The system of claim 38, wherein the instructions include directing the holder to alter a cell defined by one of a plurality of columns and one of a plurality of rows.

41. The system of claim 40, wherein the location of the code corresponds to one of said plurality of columns and one of said plurality of rows.

* * * * *